United States Patent
Dickman et al.

(10) Patent No.: US 6,264,176 B1
(45) Date of Patent: Jul. 24, 2001

(54) AERATION DIFFUSER

(76) Inventors: Daniel H. Dickman, 2513 Roosevelt Rd., Kenosha, WI (US) 53143; Ted K Vollmer, 4003 53rd Ave., Kenosha, WI (US) 53144

(*) Notice: Subject to any disclaimer, the term of this patent is extended or adjusted under 35 U.S.C. 154(b) by 0 days.

(21) Appl. No.: 09/400,407

(22) Filed: Sep. 21, 1999

Related U.S. Application Data

(63) Continuation-in-part of application No. PCT/US98/06577, filed on Apr. 2, 1998.
(60) Provisional application No. 60/043,378, filed on Apr. 4, 1997.

(51) Int. Cl.[7] .................................................. B01F 3/04
(52) U.S. Cl. ..................... 261/77; 210/221.2; 210/758; 261/120; 261/122.1; 261/124
(58) Field of Search ............................ 261/122.1, 124, 261/120, 77; 210/220, 221.2, 758, 242.2

(56) References Cited

U.S. PATENT DOCUMENTS

| | | |
|---|---|---|
| 1,343,123 | 6/1920 | Gahl et al. |
| 2,383,946 * | 9/1945 | Tietig .................... 261/77 X |
| 2,997,284 * | 8/1961 | Nechine ................. 261/77 X |
| 3,133,878 * | 5/1964 | Kober ..................... 210/220 |
| 3,232,866 * | 2/1966 | Morgan .................... 210/15 |
| 3,642,260 | 2/1972 | Danjes et al. ........... 261/122 |
| 3,852,384 * | 12/1974 | Bearden .................... 261/77 |
| 4,029,581 | 6/1977 | Clough, Jr. et al. ..... 210/220 |
| 4,134,734 * | 1/1979 | Winter, III ............ 261/77 X |
| 4,215,082 * | 7/1980 | Danel ................... 261/77 X |
| 4,273,731 * | 6/1981 | Laurie et al. ............. 261/77 |
| 4,379,750 | 4/1983 | Tiggelbeck .............. 210/232 |
| 4,581,137 * | 4/1986 | Edwards et al. ..... 261/124 X |
| 4,597,530 * | 7/1986 | Goudy, Jr. et al. ....... 239/452 |
| 4,820,457 * | 4/1989 | Jager ..................... 261/120 |
| 4,929,397 * | 5/1990 | Jager ................. 261/122.1 X |
| 4,958,770 * | 9/1990 | Mitchell .................. 239/145 |
| 5,030,362 * | 7/1991 | Da Silva et al. .... 261/122.1 X |
| 5,690,864 * | 11/1997 | Tyer ..................... 261/122.1 |

* cited by examiner

Primary Examiner—Richard L. Chiesa
(74) Attorney, Agent, or Firm—Joseph Kivlin; Ronald Brockman

(57) ABSTRACT

A diffuser for mixing and oxygenating water or other liquid with an airstrip employs a self supporting microporous tubular membrane, arranged in a spiral or grid configuration, with openings between proximate elements which, are at least equal to the diameter of the membrane. Gas, when forced through the tubular membrane, forms fine bubbles which agitate, oxygenate and entrain the surrounding liquid as it slowly passes through the openings. The tubular membrane is flexible and is to be mounted on a manifold which connects it to a source of air or gas, and which may also impart buoyancy or serve as anchor in the liquid.

6 Claims, 7 Drawing Sheets

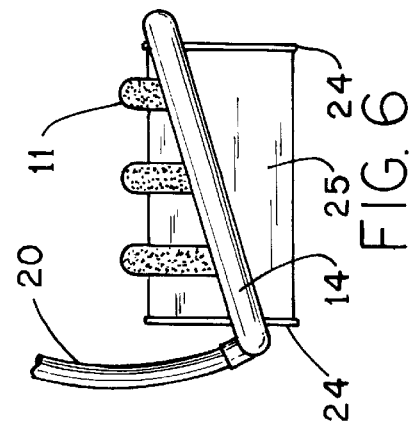
FIG. 6
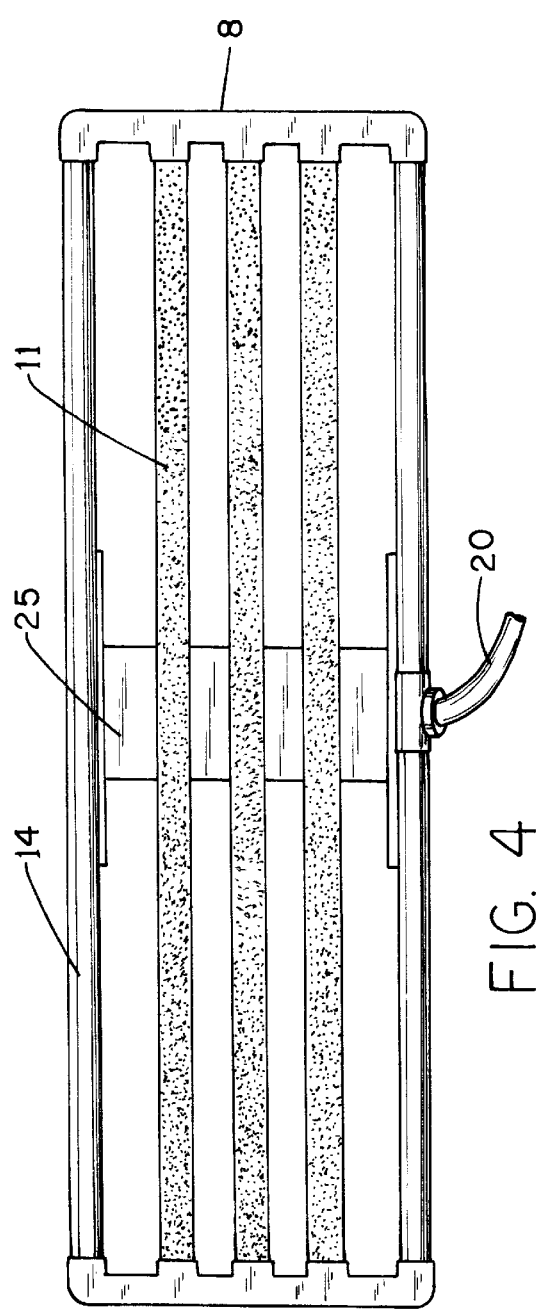
FIG. 4
FIG. 5

AERATION DIFFUSER

This application is a continuation-in-part of international application number PCTUS98/06577 filed Apr. 2, 1998, which was in turn a continuation-in-part of U.S. provisional application Ser. No. 60/043,378, filed Apr. 4, 1997.

TECHNICAL FIELD

This invention relates to a new and improved diffused gas system for treating aqueous media with fine bubbles of air or other gas, and to the method of conducting such treatment.

BACKGROUND ART

For many years, it has been known that oxygenation results in the biological and chemical breakdown of organic contaminants in effluent or wastewater. The surface of a body of liquid provides some oxygen uptake or absorption, because of its exposure to the atmosphere. However, when prior art diffused gas systems are used in order to accelerate the oxygenation, they require the use of additional devices to promote proper mixing. It is well-known to be important for cost reasons, to Ionize the time and energy required for such treatment. The unique design of the diffuser of this invention enables it to efficiently achieve both of these requirements from a single power source.

Similar considerations apply to the newer area of commerce, often referred to as aquaculture or "fish farming". The medium in which fish will thrive must be rich in oxygen and well mixed. Supplying adequate amounts of oxygen, and dispersing it uniformly throughout the tank is of primary importance to the success of such enterprises. The diffuser of this invention accomplishes both functions economically.

In the treatment of effluent, there have been a number of methods used in the prior art to expose a greater surface area of effluent for contact with the atmosphere, including devices such as fountains to spray the liquid into the air. Others, such as the Bearden patent, U.S. Pat. No. 3,852,384 have devised submerged vertical columns with means to intermix liquid and air passing therethrough. Kober, U.S. Pat. No. 3,133,878 discloses an arrangement to create a circular flow of the liquid and treating gas. Like many others, both of these patents employ a perforated pipe to dispense the gas.

The Morgan patent, U.S. Pat. No. 3,232,866 is of interest because it relates to the spacing of diffusers in the container of liquid being treated. Morgan discloses a critical relationship between oxygen uptake and the arrangement of the diffuser heads. The Goudy et. al. patent, U.S. Pat. No. 4,597,530 discusses several prior art patents in the field and covers a diffuser in the shape of a disc which is designed in such a manner as to prevent dogging of its orifices.

Some prior art employs coarse aerators or "spargers" which have the advantage of moving the liquid upward, or rolling it, as a result of relatively large bubbles of air boiling to the surface. Current diffusers which produce fine bubbles, on the other hand, are less effective in mixing or rolling the liquid as the bubbles rise to the surface, but are more effective than the coarse diffusers in their aeration effectiveness, because of the greater surface area of the fine bubbles exposed to the liquid. The design of the present invention is effective both in mixing and aeration.

Some diffusers of the prior art employ a membrane through which air is passed to produce fine bubbles, while others employ a porous stone. They are of a simpler construction than that of the present invention, and like conventional coarse air diffusers, they merely inject air into the liquid which forms large bubbles without enhancing oxygenation. The membranes of the prior art, however, are so flexible and not self supporting, that they require mounting on a kind of mandrel or internal support. Moreover, they are so easily distended when subjected to air pressure, that air is not emitted from their entire circumference. For example a tubular shaped diffuser emits air mostly from its upper surface.

SUMMARY OF THE INVENTION

The present invention consists of a flexible microporous continuous tubular membrane arranged in a variety of forms including a spiral or grid configuration. When connected to a source of air, the membrane provides fine bubbles which are emitted around its entire circumference, even at the bottom. Because the resistance of the membrane is low, this is accomplished with less than two (2) inches of water column pressure difference between the top and bottom of the membrane. In both the spiral and grid configurations, substantial openings must be provided between adjacent elements of the tubular membrane. The fine bubbles generated by the membrane entrain the liquid being treated to move it through such openings. This is a critical feature of the structure of the present invention, resulting in the liquid being rolled over or inverted on a horizontal axis, like the coarse bubble diffusers, but, because of the fine bubbles emitted, it is far superior to them in oxygenation effectiveness. It has been observed, in the spiral diffuser of this invention, that the volume of liquid being raised by the fine bubbles, is also rotated around a vertical axis as it rises. This further contributes to mixing and oxygen absorption, due to increased retention time of the fine bubbles emitted The continuous turnover of the liquid from top to bottom, increases the natural effectiveness of this invention. As is well known, there is a natural deansing process which occurs twice annually in lakes, rivers and streams. The present invention mimics that natural inversion, with the advantage that it can be repeated as often as needed.

The efficiency of the present invention is so substantial that the energy requirements are dramatically reduced by permitting the use of a much smaller motor to drive the blower. This is confirmed by the much higher Standard Oxygen Transfer Efficiency levels of the present invention as compared to the prior art resulting in 25% to 45% reductions in the horsepower requirement and corresponding reductions in the cost of both energy and equipment. This accompanies the greatly enhanced natural process of mixing, fine bubble aeration, and surface absorption of oxygen. The open structural design also minimizes fouling from debris in the liquid being treated, an advantage especially important in wastewater applications.

Preliminary testing indicates than a 22 inch fine air grid of the present invention has more than four times the rolling movement or inversion of the liquid being treated, as compared to all known prior art fine air diffusers, when the same amount of air flow is used. Such tests also show a better total liquid movement as compared to coarse air diffusers when the same amount of air flow is used. This is because the present design provides at least four times the active membrane surface area, and emits "fine point" bubbles in that area, having a vertical interface about ten times as large as most conventional diffusers. The "vertical interface" refers to the vertical edges of exposed membrane.

As for effectiveness, independent testing has shown that the diffusers of present invention have superior oxygen uptake performance which is more than twice as great as the best conventional aerator previously employed, a membrane tube. No comparison was made with rubber dome or ceramic diffusers of the prior art, which are known to be even less effective than such membrane tubes.

Oxygen transfer, also called Standard Aerator Efficiency (SAE) is measured by using a test procedure called the "clean water non-steady state" test, and results are given as the number of pounds of oxygen per hour per horsepower ($O_2$/Hr./HP). All test results were calculated using the standard ASCE (American Society of Civil Engineers) method, i.e. the accepted non-linear regression method.

Typical diffusers of the prior art have SAE values of 2 to 7 pounds of $O_2$/Hr./HP, when the air flow rate ranges from 1 to 10 Standard Cubic Feet of Air per Minute (SCFM). Many prior art diffusers have a very low oxygen transfer rate when the air flow rate is greater than 2 or 3 SCFM, and some cannot be operated above 5 SCFM. The diffusers of the present invention, however, have a SAE values even at 10 SCFM, ranging from nearly 5 to 10 pounds $O_2$/Hr./HP.

The independent comparative tests also show loss of air pressure or "Head Loss" ($H_L$) values of diffusers of the present invention are much lower and far superior to the prior art. Prior art head losses range from 6 to 35 inches of water column pressure over a range of 1 to 10 SCFM per diffuser. Most diffusers' head loss is so inefficient at 4–5 SCFM that they cannot be used. The diffusers of the present invention have a low head loss even at 10 SCFM ranging from 2.5 to 27 inches.

In addition, such tests demonstrate the Standard Oxygen Transfer Efficiency (SOTE) percent per foot of submergence is often one and one-half to two times better than prior art diffusers. Typical diffuser SOTE values range from 0.5 to 2.2% over a range of 1 to 10 SCFM per diffuser. Most diffusers are very inefficient at greater than 4 to 5 SCFM, with some being inoperable at levels above 5 SCFM. The diffusers of the present invention have SOTE's of 2.4% to 2.9% even when operated as high as 10 SCFM.

An ideal spiral structure according to this invention uses a buoyant manifold frame which allows the spiral to be anchored in a generally horizontal position at any desired depth in the liquid being treated. By locating the diffuser near the bottom of the liquid, more bottom deaning and detoxification is achieved, due to the boiling or rolling action described above. The manifold for the present invention furnishes air to both ends of the membrane, providing a more balanced distribution of air throughout the membrane than if it were connected to one end only.

The ideal grid structure, the embodiment preferred for use in large aquaculture tanks, has a different structure because it is designed to rest on the tank bottoms. However the principles employed are the same. In the grid shown in the drawings and described below, the several lengths of tubing membrane are not disposed in a horizontal plane. They are arranged in a way which produces the required openings between adjacent lengths of tubular membrane. Eke the spiral design, membranes in the grid are furnished with air at each end in order to balance the air flow more evenly among them.

A variation of the grid structure employs membranes, which are attached to a manifold only at one end, with the free ends being mobile and thereby adapted for use in moving liquid.

BRIEF DESCRIPTION OF THE DRAWINGS

FIG. 4 is a top elevation of the grid diffuser of the present invention;

FIG. 5 is a side elevation of said grid diffuser;

FIG. 6 is an end elevation thereof.

BEST MODE FOR CARRYING OUT THE INVENTION

Figure 1:
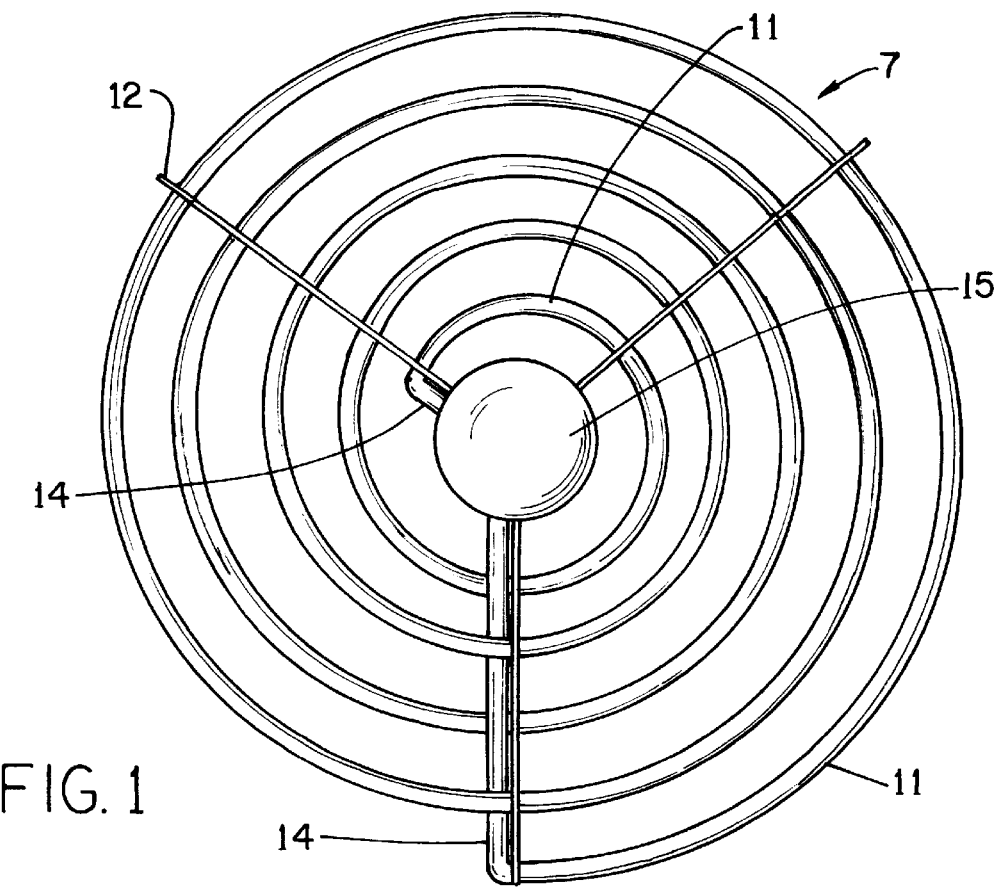
FIG. 1 is a top elevation of a spiral diffuser of the present invention.
Figure 2:
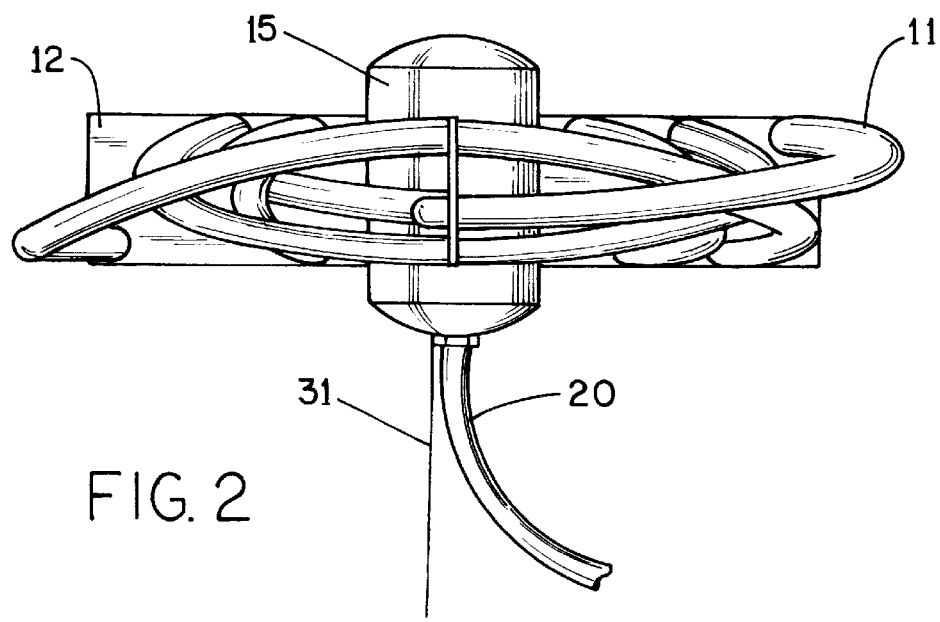
FIG. 2 is a side elevation of said spiral diffuser.

FIG. 1 depicts one embodiment of the present invention, wherein a microporous tubular membrane 11 is arranged in a spiral configuration. The spiral diffuser is shown generally at 7 in FIG. 1 of the drawings. As shown in FIG. 2, said diffuser consists of tubular membrane 11 interwoven around vanes 12, of which three are shown to be extending radially from the center of the structure, in such a way as to create large openings between the coils of said membrane 11. Tubular membrane 11 is self supporting in the sense that it does not require any internal structure to maintain its integrity. It is not measurably distended by the pressure of air passing through it, by the depth at which it is operated, nor by any combination of these two factors. It has been found that tubular membrane 11 should preferably have a maximum internal diameter of about 1 inch and a maximum outer diameter of about 1½ inches, and a pore size in the range of 50–500 microns, preferably at the low end of such range. The minimum optimum membrane diameters should be about ⅜" ID and about ½" OD, and the optimum pore size should be about 50 to 100 microns. Pores smaller than about $50\mu$ will produce the fine bubbles desired under this invention, but they are less suitable because of the greater air pressure required and resulting higher operating cost. One preferred membrane is that which is made according to the method disclosed in U.S. Pat. No. 4,958,770.

Figure 3:
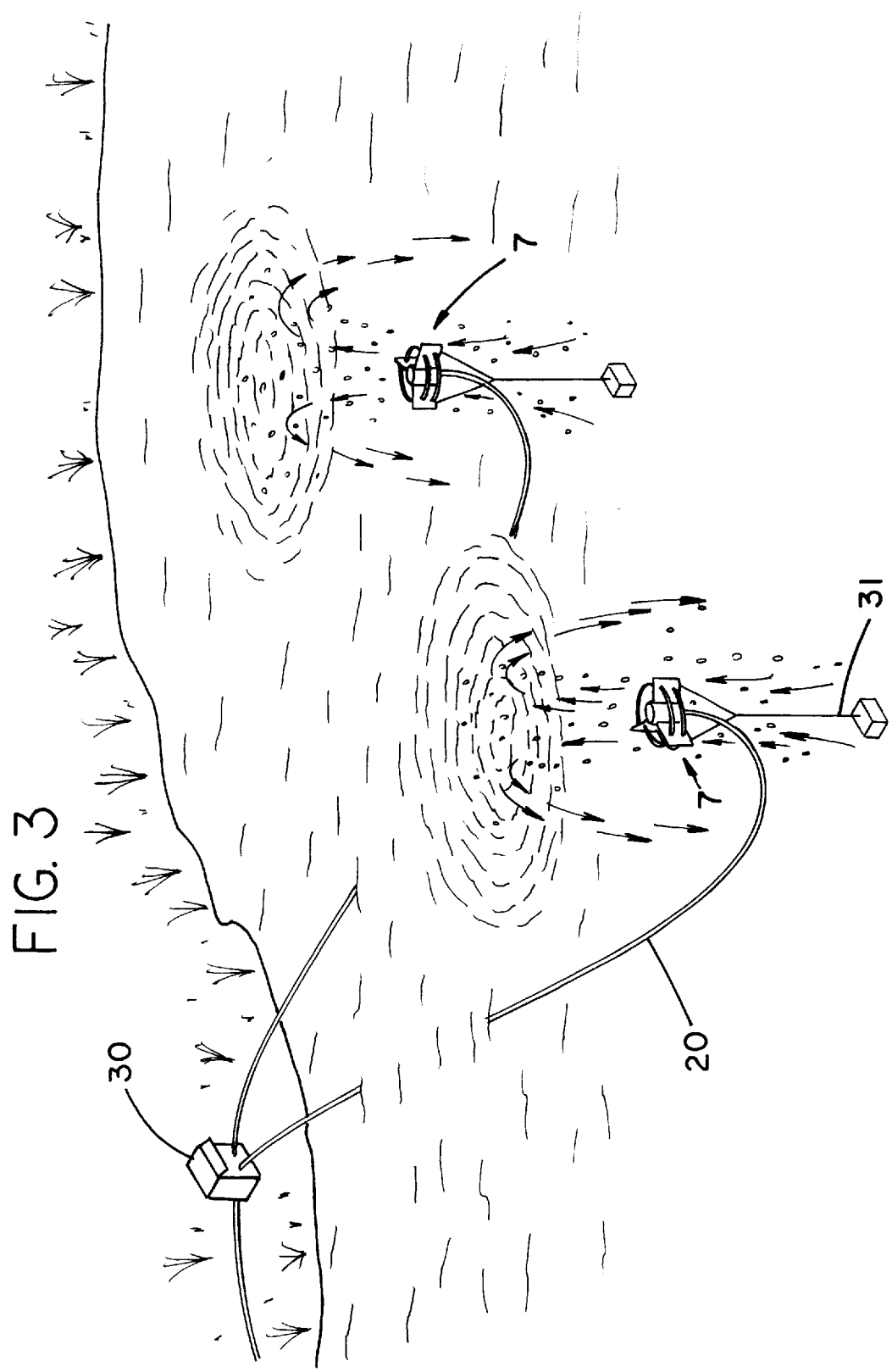
FIG. 3 is a perspective view, showing a pair of said spiral diffusers anchored in a body of liquid.

As shown in FIG. 3, spiral diffuser 7, when in use, is generally horizontally disposed, but lies in multiple planes because of the interweaving around vanes 12. One spiral diffuser, found to be very effective, uses about 17 feet of such tubing, and has an overall diameter of about 22 inches. A critical element of the present invention is that there be ample openings between the proximate arcs of tubing 11 of spiral diffuser 7, and between proximate lengths of tubing 11 in the grid diffuser 8, and between the proximate lengths of tubing 11 in the diffuser for flowing streams shown in FIG. 9. Such openings should be at least as large as the outer diameter of tubing 11, to provide optimum performance in agitating or rolling the liquid being treated, in aerating the same and in raising debris from the lower levels of said liquid. In the case of the stream diffuser of FIG. 9, such spacing ensures that solids will not become entangled or impede the liquid flow.

Manifold 14 of spiral diffuser 7 is connected to pump 30 by means of non-porous tubing 20, as shown in FIG. 3. It will be obvious that a similar hook-up can be made for grid diffuser 8. Cylinder 15 and pipe 14 in spiral diffuser 7 comprise an air distribution manifold which provides buoyancy to the diffuser. FIG. 1 shows diffuser 7 as having three vanes 12 extending radially from and supported by cylinder 15, but a greater number could be employed without departing from this invention. Pipe 14 is attached at both of its ends to a source of air, namely at the bottom of cylinder 15 and at the end of its radius. This arrangement helps to equalize the air pressure throughout the length of tubular membrane 11. As best seen in FIG. 3, anchor lines 31 position one or more spiral diffusers 7 at the desired depth and location in a pond of liquid to be treated, where hose 20 connects the manifold with pump 30.

Figure 7:
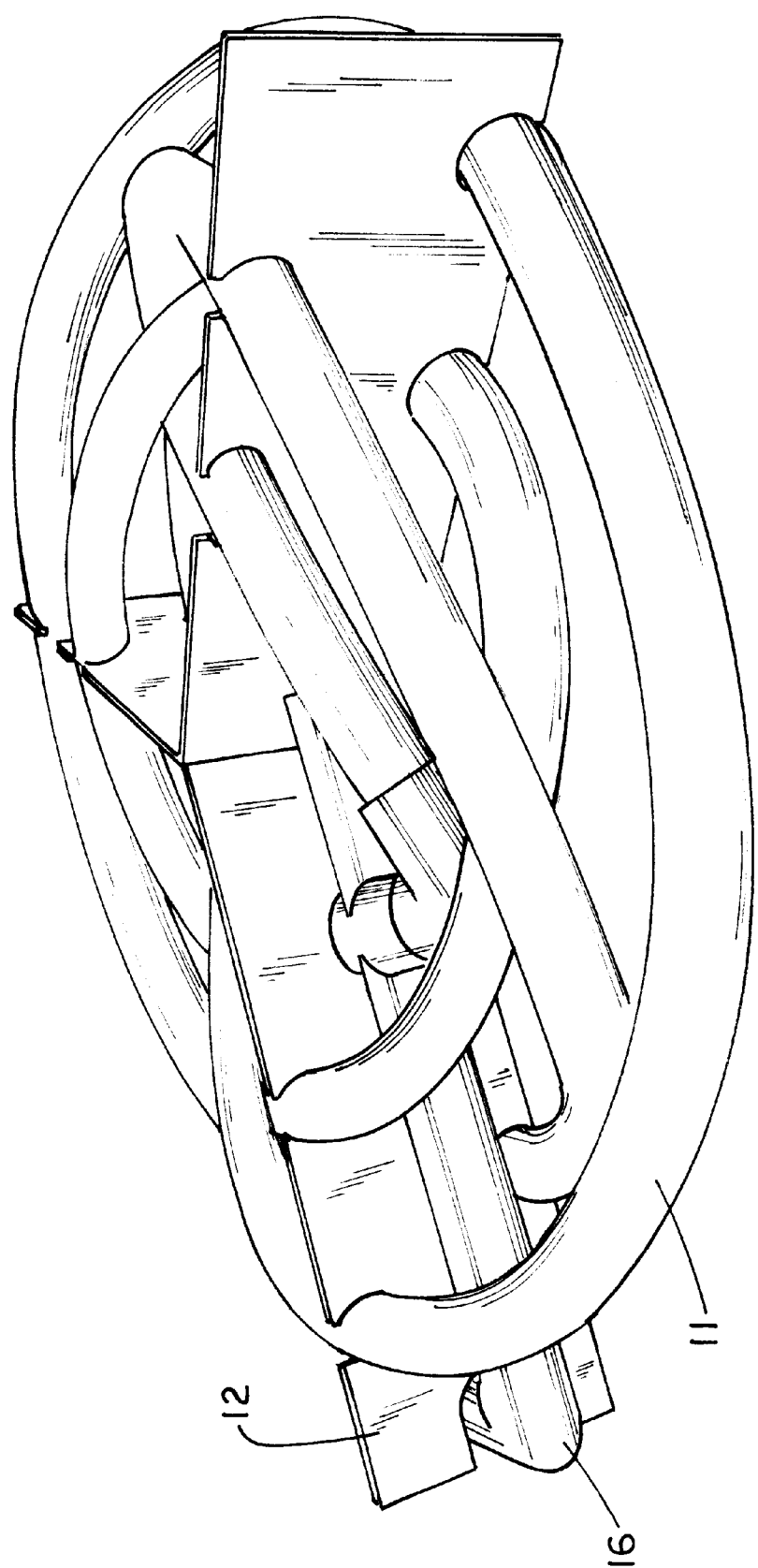
FIG. 7 is an alternate form of spiral diffuser in a perspective view.
Figure 8:
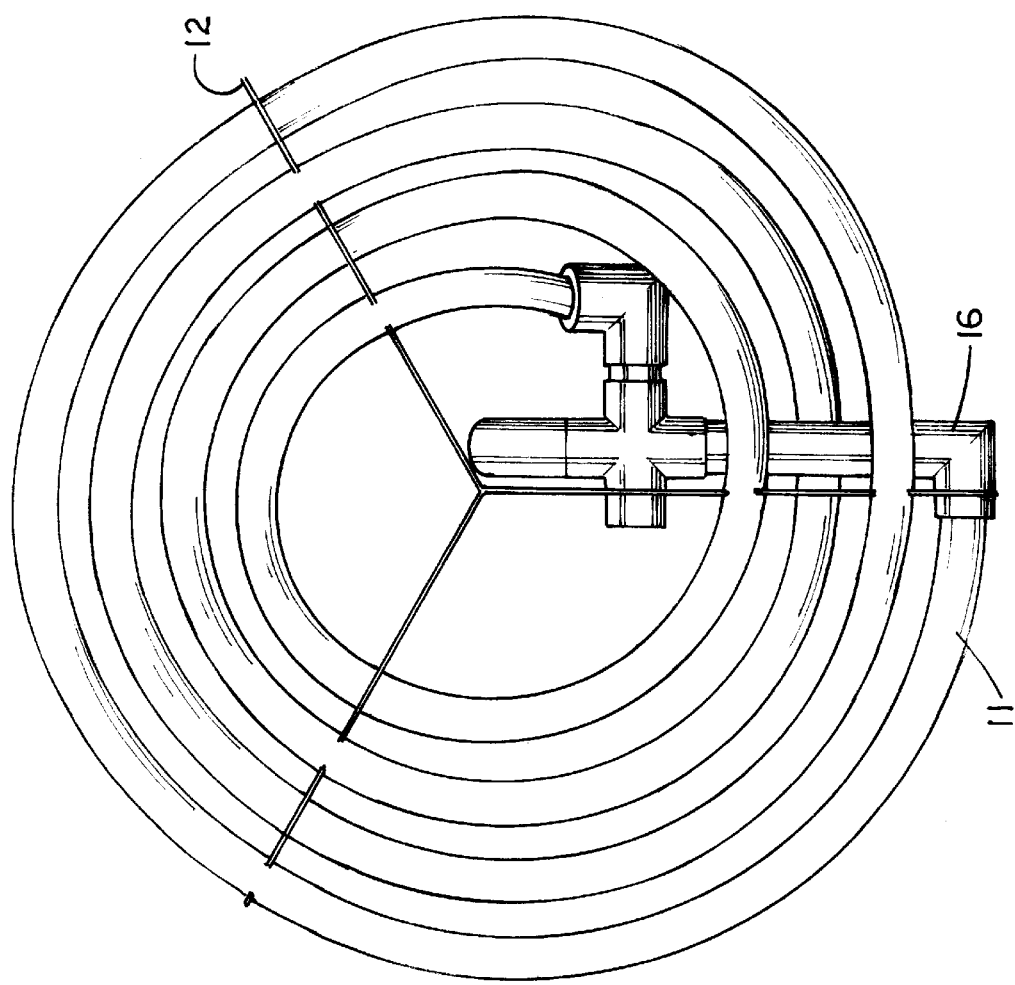
FIG. 8 is a top elevation thereof.
Figure 8A:
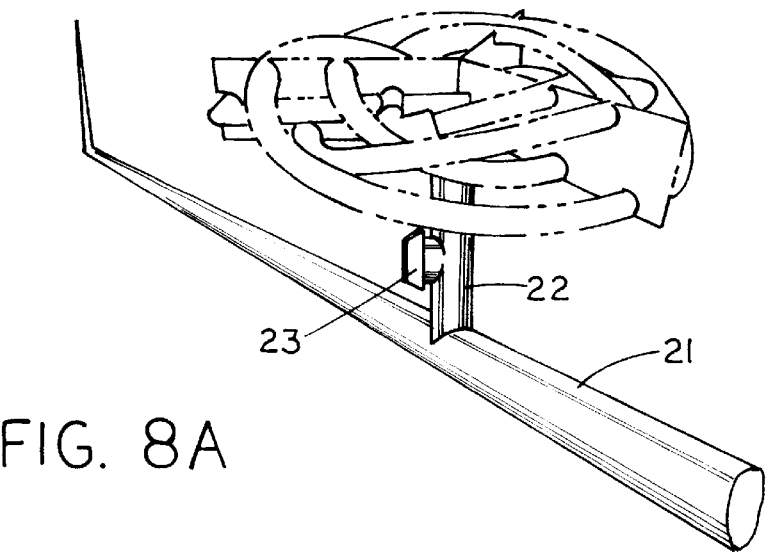
FIGS. 8A & 8B are perspective views of said alternate spiral diffuser, showing two different anchoring means therefor.
Figure 8B:
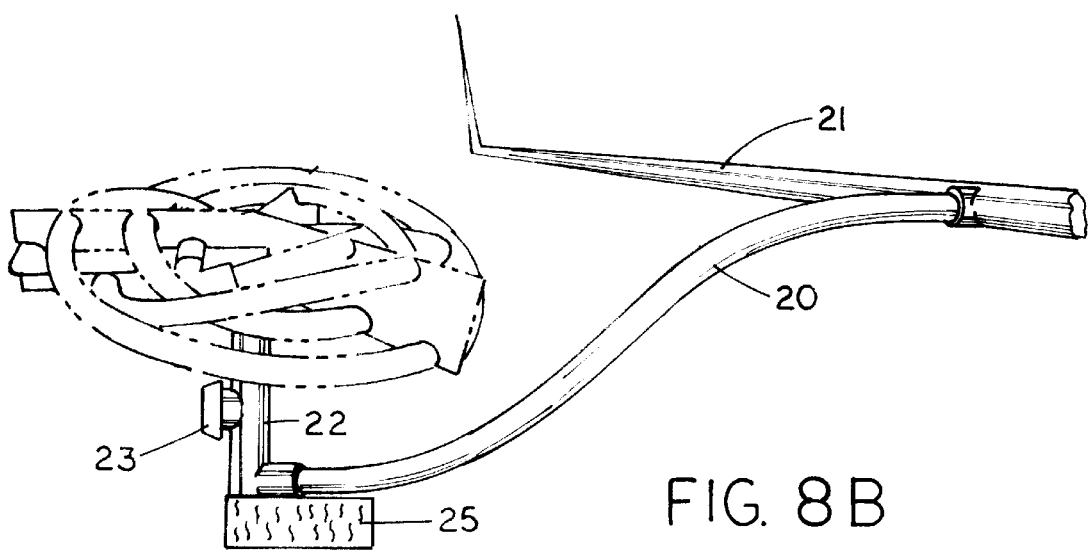

One skilled in the art would recognize that cylinder 15 can be located elsewhere, or even eliminated as shown in FIGS. 7 through 8B. Feeding air to both ends of pipe 14 must still be arranged, however, because the tubular membrane causes so little back pressure that the most remote portions are otherwise nearly devoid of air. Vanes 12, shown in FIGS. 1 and 2, consist of polyvinyl chloride, but any other plastic can be substituted as long as it has requisite structural characteritics and is inert with respect to the liquid being treated. It is also possible to employ stainless steel in place of the PVC, and spiral diffusers of the present invention have been built using stainless wire to form the vanes.

Grid diffuser 8 has similar performance characteristics to spiral diffuser 7. However, it has a different configuration to adapt it for use in the large tanks or pools used in aquaculture. In that use, it is desirable for the diffuser to be positioned on the tank bottom, which requires that it be provided with supporting legs or feet. Spiral diffuser 7, on the other hand is better suited for treatment of wastewater, where it is usually most effective when positioned above the bottom where it will be less subject to fouling by sediment usually found at that medium.

Grid diffuser 8 is provided with multiple lengths of porous tubing 11, three lengths being shown in FIGS. 4, 5, and 6, each of which is attached at each end to pipe 14. FIG. 4 shows pipe 14 forming a rectangular shaped manifold, although one skilled in the art would appreciate that a square or other configuration may desirable for certain uses. It also shows the three lengths of porous tubing 11 being parallel to one another, parallel to the major axis of the rectangular manifold, and appears to show them to be of equal length and equidistant from one another. Diffiser 8 is depicted in its operative position in FIGS. 5 and 6, supported by a pair of equilateral trapezoidal legs 24, one of which is mounted on each end of weight 25. Weight 25 preferably has a cylindrical shape and extends between legs 24 with its major axis perpendicular thereto and parallel to the base of legs 24.

The lengths of porous tubing 11 in grid diffuser 8 extend over weight 25 between the two ends of manifold 14, as best seen in FIGS. 5 and 6. Said manifold is shown in FIG. 6 to be mounted at a different level on each of the legs 24, so that its minor axis is not parallel to the base of either of legs 24. The result of this design is that the lengths of porous tubing 11 are not of equal length, and are not equidistant from one another at all points, when passed over cylindrical weight 25. They are equidistant where attached to manifold 14, and at the portion which passes over weight 25, as best seen in FIG. 5. Such an arrangement is necessary in order to help equalize air pressure throughout the manifold, with the elevated length of tubing 11 receiving more air merely because of its higher elevation. The structure also has the benefit of enlarging the openings between adjacent lengths of tubular membrane, whereby the spacing between them is greater than if they were completely parallel Preferably such openings are at least as large as the outer diameter of said tubing, enabling the free passage of sediment therebetween.

Another embodiment of the spiral diffuser of the present invention, shown in FIGS. 7, 8, 8A & 8B, is in most respects identical to the spiral diffuser shown in FIGS. 1 and 2. ft employs the same microporous tubing, the same materials for its vanes, and has the same openings between proximate elements. The obvious difference is that it does not have a central cylinder to provide support for the vanes. Sufficient support is obtained by a different configuration of its manifold 16, which is in contact with, or extends through at least one of said vanes.

FIGS. 8A and 8B show said alternate spiral diffuser with different mounting means. Instead of anchor lines, it is shown in FIG. 8A as attached directly to a relatively rigid tube or pipe 21. The connecting means 22 is also rigid and is provided with shutoff valve 23. Depending on the application, pipe 21 can be mounted at any desired depth in the liquid to be treated. In FIG. 8B, the alternate spiral diffuser is shown connected to a similar rigid pipe 21, by connecting means 22 and shutoff valve 23. However, in this embodiment, the alternate spiral diffuser has a flexible non-porous tube 20 extending between rigid pipe 21 and connecting means 22, and it is also attached to a weight of sufficient mass to hold said diffuser at the bottom of the liquid being treated.

Figure 9:
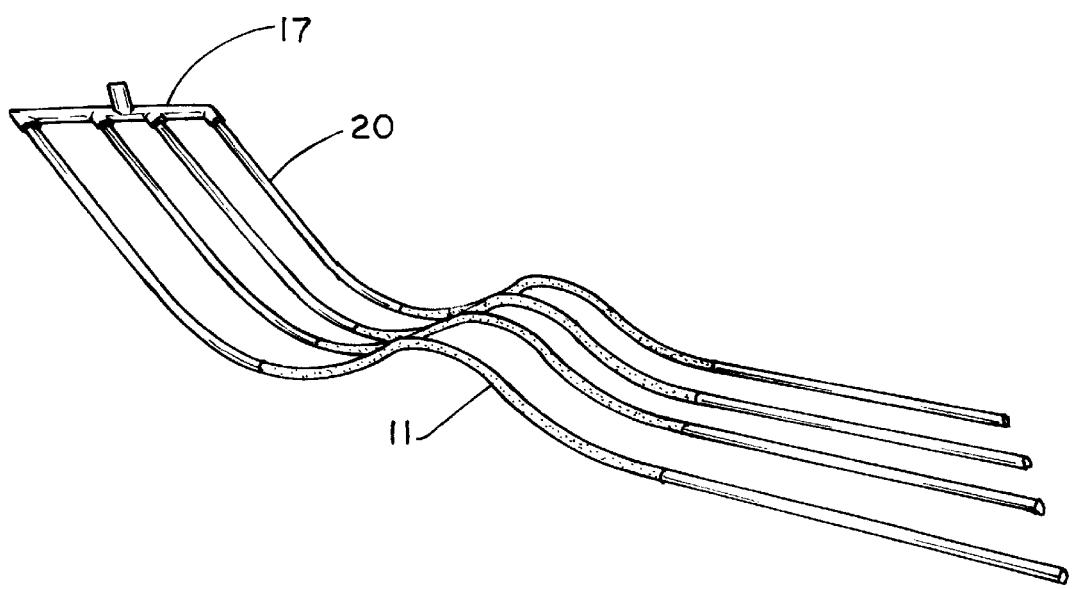
FIG. 9 depicts, in perspective, a second alternate structure adapted for use in flowing liquid.

The last illustrated embodiment of a diffuser of this invention, shown in FIG. 9, is suited for use in a different environment than those described hereinabove. This configuration enables it to be used in the treatment of moving streams of liquid, for example within a large pipe carrying liquid to be treated, or even m an open stream In this embodiment, the same microporous tubing 11 is employed, and it has the required spacing between its proximate elements of microporous tubing. It does not have a spiral configuration, and it is in a grid configuration only part of the time it is operating.

As shown in FIG. 9, the microporous tubing comprises only the central part of each length of tubing. Four lengths of tubing are shown attached by means of non-porous tubing 20 to a T-shaped manifold 17. As in the other diffuser forms, such manifold may be connected by rigid pipe or additional non-porous hose to a source of air. FIG. 9 shows the microporous tubing connected only at one end to the source of air, and with this arrangement, tubing 11 is free to move or undulate within the flowing liquid being treated. Such movement permits solid materials to pass around and between the several lengths of tubing 11.

It is necessary to close off the ends of tubing 11 in this embodiment, to prevent air from escaping except through the pores of tubing 11. In addition, it has been found necessary to weight the free ends said microporous tubing 11 in order to limit their movement. This can be accomplished by attaching to the free end of each tube 11 weight means 18 of suitable length and/or mass, which may be a weighted non-porous tube, or other elongated means of suitable mass to achieve the desired limited movement.

As with the other diffusers of this invention, the fine bubbles provide very efficient oxygenation of the flowing stream. In addition, the fine bubbles are entrained within the flowing liquid enhancing its treatment as it flows. If disposed within a pipeline, any air escaping to the liquid surface remains within the pipeline for absorption. This embodiment has the added benefit of reducing the malodor of a stream of effluent.

It will be obvious to one skilled in the art that this embodiment can be modified without departing from the spirit of the invention by varying the number or length of the microporous tubing.

COMMERCIAL APPLICABILITY

The product and process of this invention may be used for the low cost and effective treatment of aqueous media with gas in all forms of commerce.

What is claimed is:

1. An improved diffuser for the oxygenation of aqueous media, and for the inversion mixing of the same, which employs a pressurized oxygen-containing gas and a pump for pressurizing said gas, said diffuser consisting of a self-supporting flexible microporous tubular membrane and a manifold connecting said pump to said membrane, said membrane
   a.) having throughout its entire extent, uniformly fine pores, ranging in size from about 50 to 500 microns;
   b.) having a balanced gas flow, whereby said gas is emitted uniformly from its entire circumference in the form of fine bubbles; and
   c.) being mounted on said manifold in a manner which provides proximate elements of said membrane, said proximate elements having openings therebetween, said openings being at least equal to the outer diameter of said membrane.

2. The diffuser of claim 1, having a Standard Aeration Efficiency ranging from 4.8 to 10 pounds oxygen per horsepower per hour, Head Loss from about 2.5 to 27 inches of water column pressure, and with Standard Oxygen Transfer Efficiency ranging from 2.5% to 2.9% per foot of submergence over a range of about 1 to 10 Standard Cubic Feet of air per Minute.

3. The diffuser of claim 2 having a spiral configuration.

4. The diffuser of claim 2 having a rectangular or square configuration.

5. The method of simultaneously oxygenating and inversion mixing aqueous media which comprises immersing therein a diffuser having a Standard Aerator Efficiency ranging from 4.8 to 10 pounds oxygen per horsepower per hour, Head Loss from about 2.5 to about 27 inches of water column pressure, and with Standard Oxygen Transfer Efficiency ranging from about 2.4% to 2.9% per foot of submergence over a range of about 1 to 10 Standard Cubic Beet of air per Minute.

6. A method of simultaneously mixing and oxygenating aqueous media which comprises immersing therein a diffuser comprising a self-supporting flexible microporous membrane having thoughout its entire extent uniformly fine pores ranging in size from 50 to 500 microns, the membrane being configured to provide openings between proximate elements thereof, the openings being at least equal to the outer diameter of the membrane, and the membrane being mounted on a manifold which connects the membrane to a source of pressurized gas, forcing the gas evenly through the entire circumference of the membrane with sufficient pressure to expel the gas as fine bubbles through the fine pores and to cause the bubbles to rise slowly and to entrain and invert the aqueous media.

* * * * *